United States Patent [19]
Kiguchi

[11] Patent Number: 5,144,650
[45] Date of Patent: Sep. 1, 1992

[54] COMMUNICATION APPARATUS HAVING IMPROVED SWITCHING LINE CONNECTION BETWEEN DIFFERENT SIGNAL PATHS

[75] Inventor: Masao Kiguchi, Yokohama, Japan

[73] Assignee: Canon Kabushiki Kaisha, Tokyo, Japan

[21] Appl. No.: 620,617

[22] Filed: Dec. 3, 1990

[30] Foreign Application Priority Data
Dec. 14, 1989 [JP] Japan .................. 1-322551

[51] Int. Cl.$^5$ .......................................... H04M 11/00
[52] U.S. Cl. ..................................... 379/93; 379/100; 358/438; 358/443
[58] Field of Search ............... 379/100, 93, 96–98; 358/434–439, 443, 400

[56] References Cited

U.S. PATENT DOCUMENTS

| | | | |
|---|---|---|---|
| 4,794,637 | 12/1988 | Hashimoto | 379/100 |
| 4,800,439 | 1/1989 | Yoshino | 379/100 |
| 4,868,865 | 9/1989 | Ogawa et al. | 379/100 |

Primary Examiner—James L. Dwyer
Assistant Examiner—Wing F. Chan
Attorney, Agent, or Firm—Fitzpatrick, Cella, Harper & Scinto

[57] ABSTRACT

A communication apparatus comprises a switch to selectively connect a line to a speech communication path or a data communication path, signal receiving circuits connected to those two communication paths, a signal detection circuit for detecting a predetermined signal from an output of the signal receiving circuit, and a control circuit for modifying a detection criterion of the signal detection circuit in accordance with a line connection status of the switch.

8 Claims, 4 Drawing Sheets

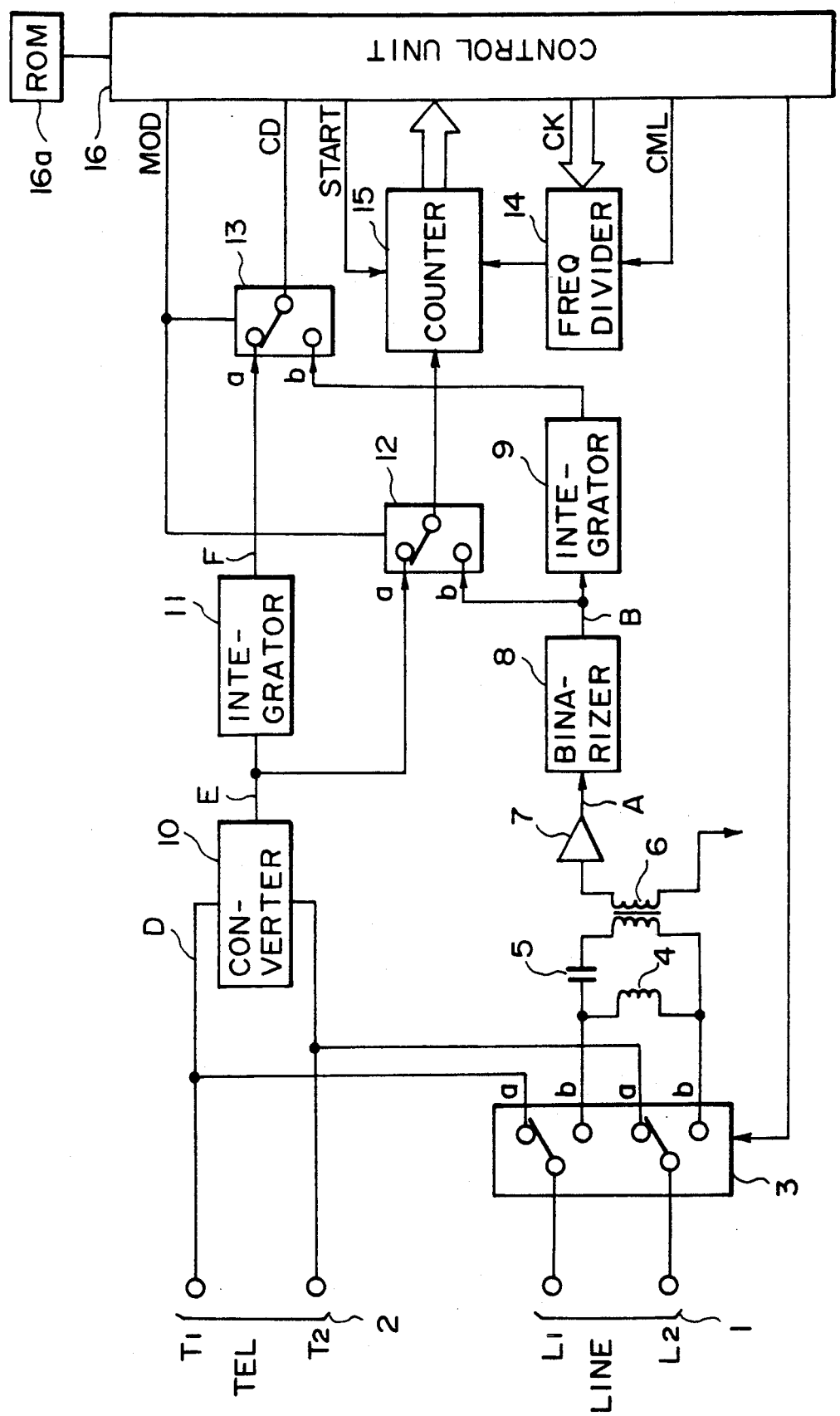
F I G. 1

(A)
(B)
(C)
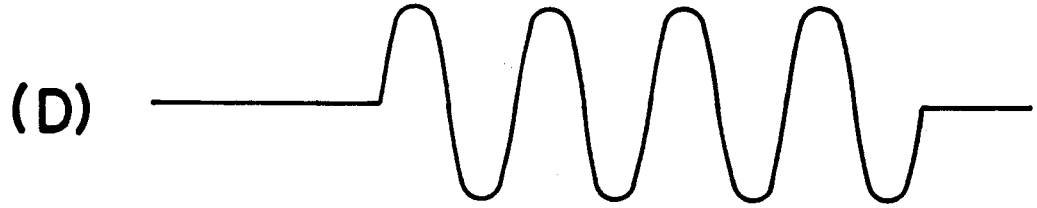
(D)
(E)
(F)
F I G. 2

COMMUNICATION APPARATUS HAVING IMPROVED SWITCHING LINE CONNECTION BETWEEN DIFFERENT SIGNAL PATHS

BACKGROUND OF THE INVENTION

1. Field of the Invention

The present invention relates to a communication apparatus, and more particularly to a communication apparatus connected to a line together with a telephone set for communicating through the telephone set and communicating data by switching line connection between a telephone communication path and a data communication path.

2. Related Background Art

In the past, in this type of apparatus such as a facsimile machine, communication control has been done in accordance with various signals received from a telephone line. Those signals include a facsimile call signal, a tonal signal, a dial tone (DT) signal and a busy tone (BT) signal. Those signals are usually detected by different systems by independent circuits because of differences of termination conditions of the lines and magnitudes of powers.

In the prior art apparatus, it is necessary to prepare separate circuits for different types of received signals. Thus, it is difficult to reduce the cost and size by reducing the number of parts. Further, software is complex because separate software control circuits are required.

A technique relating to the signal reception is disclosed in U.S. Pat. No. 4,837,806.

SUMMARY OF THE INVENTION

In the light of the above problems, it is an object of the present invention to provide an improved communication apparatus.

It is another object of the present invention to simplify a configuration of a received signal detection unit.

It is another object of the present invention to provide a communication apparatus which attains a desired signal detection with a simple configuration.

It is another object of the present invention to provide a communication apparatus which selects a signal reception circuit to be used in accordance with a switching status of a communication path and sets a signal analysis condition for that signal to properly detect the signal.

It is another object of the present invention to simplify a hardware configuration and software processing of the received signal detection unit.

Other objects of the present invention will be apparent from the following description of the preferred embodiments and the accompanying drawings.

BRIEF DESCRIPTION OF THE DRAWINGS

FIG. 1 shows a block diagram of a configuration of a facsimile machine in one embodiment of the present invention, FIG. 2 shows signal waveforms at various points in FIG. 1, and FIGS. 3A and 3B show flow charts of a control sequence in the embodiment.

DETAILED DESCRIPTION OF THE PREFERRED EMBODIMENTS

Figure 3A:
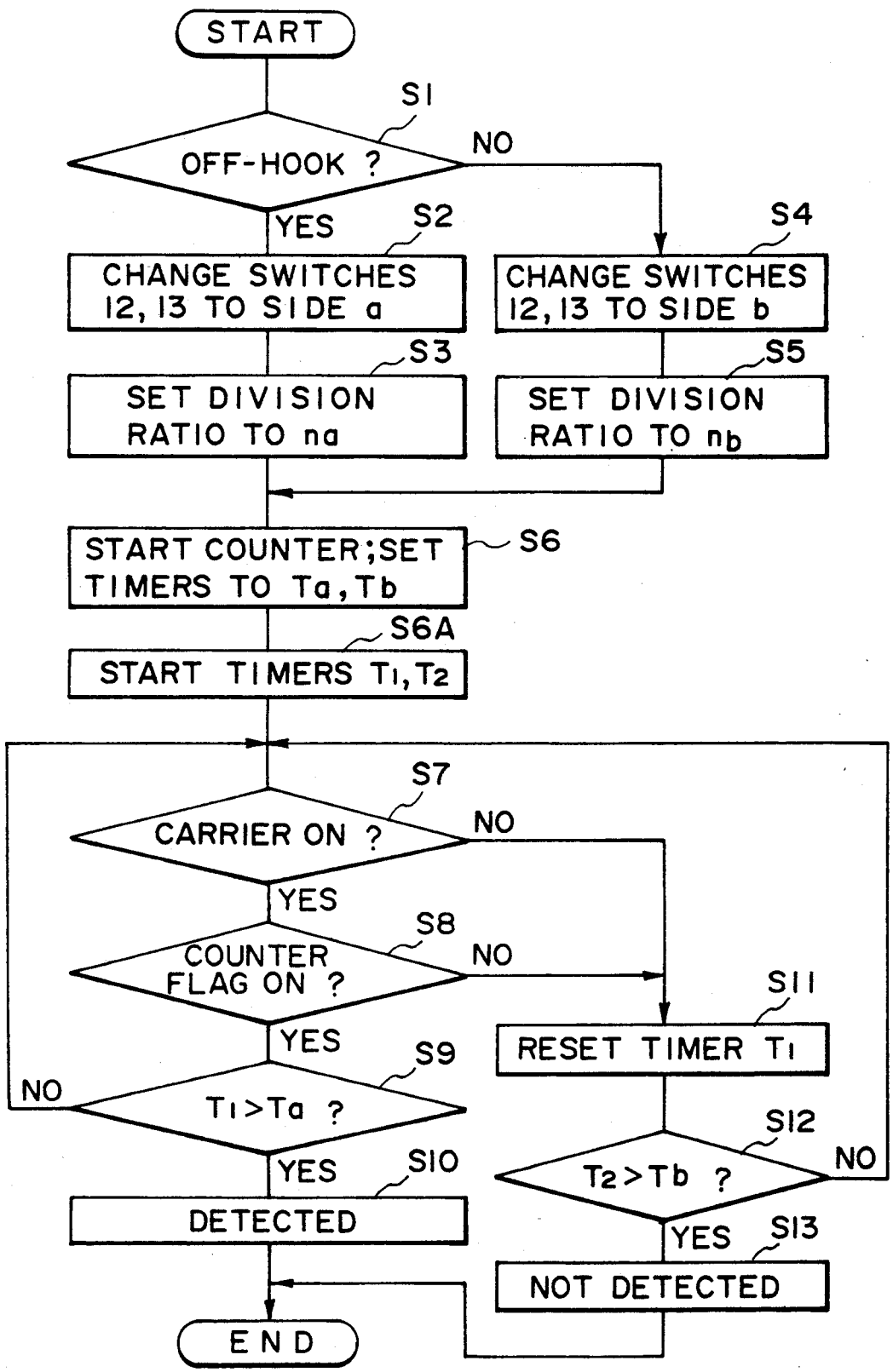

One embodiment of the present invention is now explained with reference to the drawings.

In the following embodiment, a facsimile machine is described although the present invention is applicable to not only the facsimile machine but also various communication apparatus such as telex machine or computer communication.

FIG. 1 shows a configuration of a communication apparatus in accordance with the present invention. Here, a line connection unit of the facsimile machine and a detection unit for signals received from the line are shown.

In FIG. 1, numeral 1 denotes a telephone line, numeral 2 denotes a terminal to which a speech circuit such as a telephone set or a built-in handset is connected. A line connected to the terminal 1 is switched by a CML relay 3 between a line connected to a facsimile circuit such as a modem (not shown), a RET (return) coil 4 and a capacitor 5 and a line connected to the terminal 2.

The CML relay 3 switches the telephone line between the facsimile machine and the telephone set. It is controlled by a signal CML from a control unit 16.

A circuit for detecting line signals such as a facsimile call signal, a tonal signal, a dial tone (DT) signal, a second dial tone (DT) signal and a busy tone (BT) signal is connected to each of the line connected to the terminal 2 and the line of the facsimile machine.

The detection circuit connected to the line of the facsimile machine is first explained.

Numeral 4 denotes a RET (return) coil which is used to close a line loop DC-wise when the apparatus is connected, numeral 5 denotes a capacitor for blocking DC, numeral 6 denotes an AC coupling transformer, numeral 7 denotes an operational amplifier for amplifying a small tonal signal, numeral 8 denotes a binarizer for digitizing an analog signal and numeral 9 denotes an integration circuit comprising a time constant circuit.

The detection circuit connected to the line of the telephone set is now explained.

Numeral 10 denotes a converter for binarizing an analog signal which is the facsimile call signal, and numeral 11 denotes an integration circuit comprising a time constant circuit.

Numeral 12 denotes a switch such as an analog switch which supplies one of the binarized tonal signal and the binarized facsimile call signal, that is, one of the output of the binarizer 8 and the output of the converter 10, to a counter 15.

Numeral 13 denotes a switch such as an analog switch which switches an integrated output of the output of the binarizer 8 and an integrated output of the output of the converter 10 and supplies it to the control unit 16 as a carrier detect signal CD.

The switches 12 and 13 are operated by a signal MOD from the control unit 16.

Numeral 14 denotes a frequency divider which frequency-divides a clock (CK) supplied from the control unit 16 by two or more frequency division factors in accordance with a command from the control unit 16, and numeral 15 denotes a counter which counts the clock supplied from the frequency divider 14 for only one period of the signal from the binarizer 8 or the converter 10.

Numeral 16 denotes a unit for controlling the above blocks. It constitutes a main control unit of the facsimile machine, and a control program of the control unit 16 is stored in a ROM 16a. As described above, the control unit 16 also controls the switching of the CML relay 3 and the switches 12 and 13.

The operation of the above configuration is now explained with reference to FIGS. 2 and 3. FIGS. 2(A) to FIG. 2(F) show signal waveforms at points A to F shown in FIG. 1, and FIGS. 3A and 3B show a signal detection sequence of the control unit 16 stored in the ROM 16a.

Figure 3B:
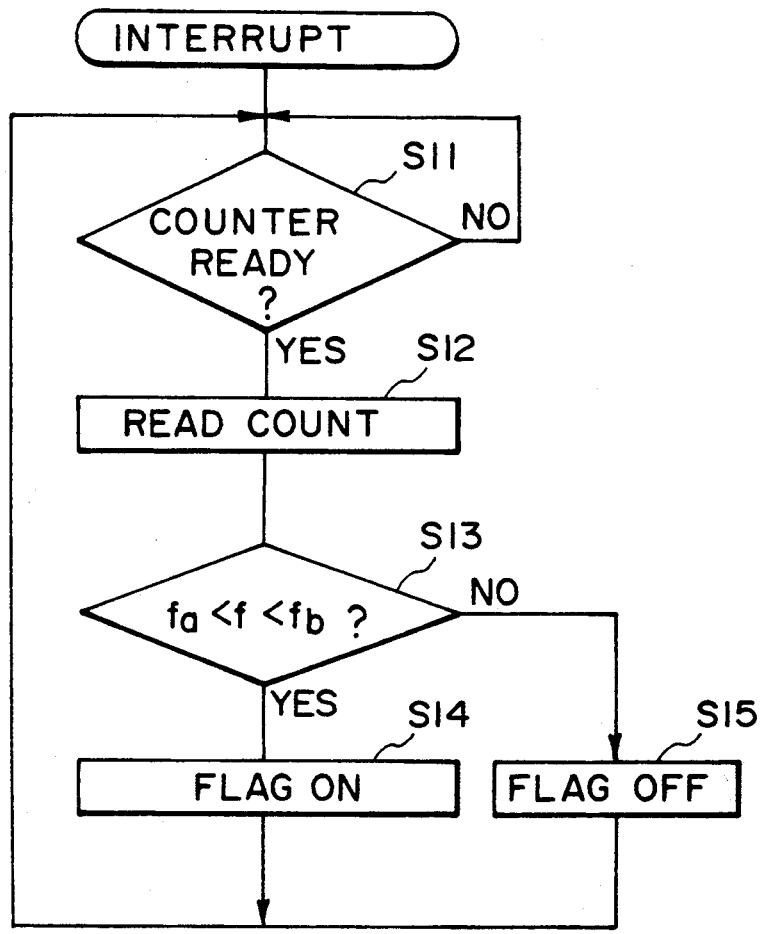

In the facsimile machine of FIG. 1, since the type of signal supplied from the terminal 1 changes depending on the communication condition, a condition at its own station is first checked in a step S1 of FIG. 3A.

If the CML relay 3 is in a position a and the telephone set connected to the terminal 2 is in an off-hook state, the facsimile machine is in a stand-by state and the signal supplied to the terminal 1 (line) is the facsimile call (CNG) signal. Thus, control is done to receive this signal. The control unit 16 can detect the hook status of the telephone set connected to the terminal 2 by an off-hook detection system (not shown), and if it detects the off-hook status, it sends the signal CML to switch the CML relay 3 to the terminal 2.

In this case, the facsimile call signal is a low frequency signal as shown in FIG. 2(D). When it is received, the waveform converted by the converter 10 is one as shown in FIG. 2(E) and the waveform integrated by the integrator 11 is one as shown in FIG. 2(F).

Thus, in a step S2, the switches 12 and 13 are switched to the position a in compliance with the electrical characteristic of the signal, and in a step S3, a frequency division factor of the counter is set to na (na<nb) in compliance with the period of the input signal.

On the other hand, if the on-hook status is detected in the step S1, the CML relay 3 is on the position b and the signal supplied from the terminal 1 (line) is the tonal (DT, BT or second DT) signal. In a step S4, the switches 12 and 13 are switched to the position B and in a step S5, the frequency division factor of the counter is set to nb. Thus, the switches 12 and 13 are ganged with the CML relay 3, to be at their position a when the CML relay 3 is at its position a, and to be at their position b when the CML relay 3 is at its position b.

In this case, each of the tonal signals is a high frequency signal compared to the facsimile call signal as shown in FIG. 2(A). When it is received, the binarized waveform from the binarizer 8 is one as shown in FIG. 2(B), and the integrated waveform from the integrator 9 is one as shown in FIG. 2(C).

After the setting of the frequency division factor, a start trigger is set in a step S6 to operate the counter. In order to monitor the consistency of the signal, timer counts Ta and Tb are set and times T1 and T2 (which may be built in the control unit 16) are started in a step S6A. An interrupt routine is also enabled.

The counter 15 is busy while it counts and is ready after the count operation. In the timer interrupt process of FIG. 3B, the ready status is monitored in a step S11 and the count f is read when the ready states is detected. In a step S13, when a condition of $$fa < f < fb$$

(where fa and fb are upper and lower limits of the frequency for determining the detection, and fa<fb) is met, a flag is set to an on state in a step S14.

The counter 15 is started in a step S6a and a carrier detect (CD) which is the output of the switch 13 is checked in a step S7.

If the carrier is detected in the step S7, the flag manipulated in the previous sub-routine is checked in a step S8 to determine if the frequency is within the range or not. If the flag is on, it means that both the carrier and the frequency meet the condition. Thus, in a step S9, whether the timer T1 previously enabled has exceeded a set count Ta or not is checked.

If one of the carrier and the frequency does not meet the condition in the step S7 or S8, the timer T1 is reset in a step S11.

In a step S12, whether the timer T2 previously started has exceeded the count Tb or not is checked, and if it has exceeded, non-reception time of signal is long and non-detection is determined in a step S13. If the timer Tb is smaller than the count Tb in the step S12, the process returns to the step S7 and repeats the following detection flow.

If T1<Ta is detected in the step S9, it means that a predetermined signal is being received, and the process returns to the step S7 to monitor the receive time and continue the following control. If T1>Ta, it means that both the carrier and the frequency have been continuously detected for the time Ta, the reception of the predetermined signal is determined.

In accordance with the present embodiment, the control unit switches the settings by the hardware and the software corresponding to the consistency of the electrical characteristic, the frequency and the carrier of the received signal to be detected and converts them to the digital signals which the microcomputer can easily process so that the received signals of different types can be detected by the common circuit and software control and the control is facilitated. It is not necessary to provide different hardware detection circuits for the respective types of signals as required in the prior art apparatus and the configuration of the apparatus is simple and inexpensive.

In FIG. 1, instead of the frequency divider 14, two checks of different frequencies may be provided and they may be switched by selection means such as a switch to attain a similar effect. In this case, the control information of the counter 15 is one bit and the configuration and the control are further simplified.

While the facsimile machine has been described above, similar configuration and control can be applied to various communication apparatus such as a data terminal having a switching line to a telephone set.

The present invention is not limited to the above embodiment but various modifications thereof may be made.

What is claimed is:

1. A communication apparatus comprising:
   means for selectively connecting a line to a speech communication path or a data communication path;
   signal receiving means connected to said two communication paths;
   signal detection means for detecting a predetermined signal from an output of said signal receiving means; and
   control means for modifying a detection criterion of said signal detection means in accordance with a line connection status of said line connecting means.

2. A communication apparatus according to claim 1 wherein said signal receiving means includes a circuit for converting an analog signal to a binary signal.

3. A communication apparatus according to claim 2 wherein said signal detection means detects a period of said binary signal.

4. A communication apparatus according to claim 2 wherein said signal detection means includes a counter for detecting a period of said binary signal, and said control means discriminates the received signal in accordance with the count of said counter.

5. A communication apparatus according to claim 1 further comprising means for supplying one of the outputs of signal receiving circuits connected to the speech communication path and the data communication paths to said signal detection means.

6. A communication apparatus connected to a line together with a telephone set for switching a line connection between a telephone communication path and a data communication path to carry out communication by the telephone or data communication, comprising:

signal receiving circuits connected to the telephone communication path and data communication path, a signal analysis circuit for detecting the reception of a predetermined signal based on an output of said signal receiving circuit; and a control circuit for modifying an analysis criterion of said signal analysis circuit depending on whether the line is connected to the telephone communication path or the data communication path.

7. A communication apparatus according to claim 6 wherein said control circuit discriminates the received signal based on the analysis by said signal analysis circuit.

8. A communication apparatus according to claim 7 wherein said signal receiving circuit converts a received analog signal to a binary signal, and said signal analysis circuit analyzes a period of said binary signal.

* * * * *

UNITED STATES PATENT AND TRADEMARK OFFICE
CERTIFICATE OF CORRECTION

PATENT NO. : 5,144,650
DATED : September 1, 1992
INVENTOR(S) : MASAO KIGUCHI

It is certified that error appears in the above-identified patent and that said Letters Patent is hereby corrected as shown below:

COLUMN 4

Line 64, "connection status of said line connecting" should read --connecting status of said line connection--.
    Line 66, "claim 1" should read --claim 1,--.

COLUMN 5

Line 1, "claim 2" should read --claim 2,--.
    Line 4, "claim 2" should read --claim 2,--.
    Line 9, "claim 1" should read --claim 1,--.

COLUMN 6

Line 10, "claim 6" should read --claim 6,--.
    Line 14, "claim 7" should read --claim 7,--.

Signed and Sealed this

Sixteenth Day of November, 1993

Attest:

BRUCE LEHMAN

Attesting Officer    Commissioner of Patents and Trademarks